V. LASSERRE.
ROOF.
No. 37,450. PATENTED JAN. 20, 1863.
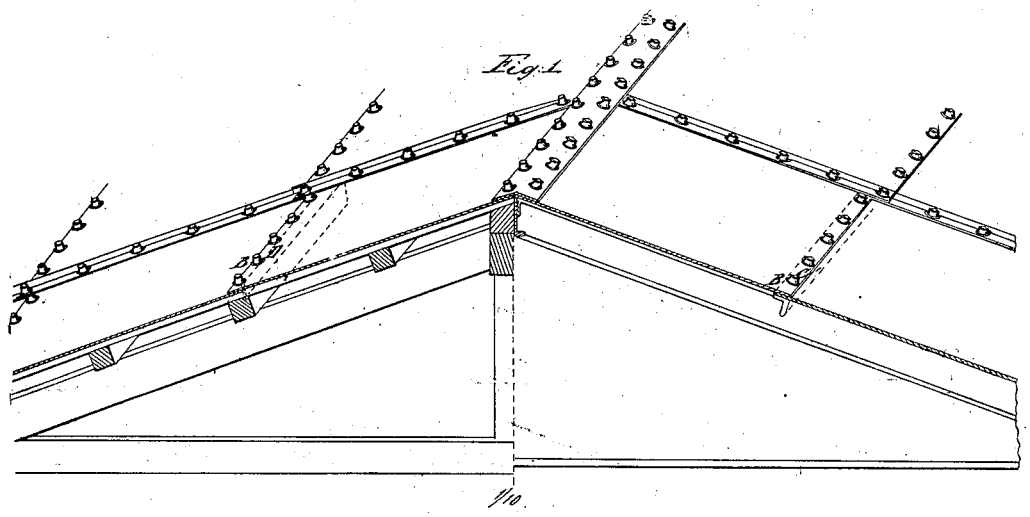
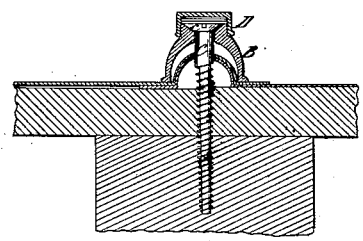
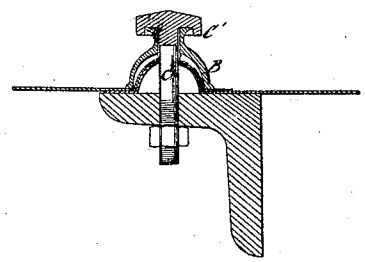
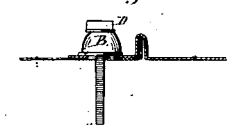
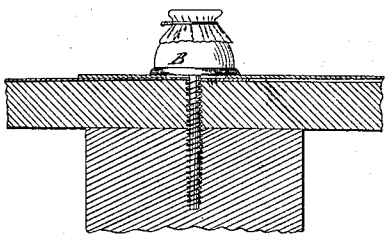
Witnesses
Inventor
Valentin Lasserre
By Fowler & Wells
Atty

UNITED STATES PATENT OFFICE.

VALENTIN LASSERRE, OF PARIS, FRANCE.

IMPROVEMENT IN ROOFS.

Specification forming part of Letters Patent No. 37,450, dated January 20, 1863.

*To all whom it may concern:*

Be it known that I, VALENTIN LASSERRE, of Paris, France, have invented an Improvement in Metallic and other Coverings for Buildings, Domes, Wagons, &c., of which the following is a specification.

My improvements consist in a new manner of attaching the metallic sheets in these kinds of coverings, by which the necessity of soldering and the defectiveness of joining are obviated, and leakage, breakage of solder, &c., avoided without involving the necessity of any change in the carpentry or form on which the roofing is applied. This new system may be applied to all kinds of plate or sheet roofing, as will be seen by the following description, though the accompanying drawings naturally represent its embodiment in metallic coverings.

Figure 1 shows in perspective a roofing embodying my improvements, one side of which I have represented as a covering of zinc applied on a wooden framing or bed, and the other a covering of sheet-iron applied on an iron frame-work. Figs. 2 and 3 show in detail the manner of uniting the parts in the case of the construction first mentioned. Figs. 4 and 5 show in detail the junction of the parts for the latter construction. Fig. 6 represents in detail a third arrangement, which is applied principally to provisional or temporary coverings.

As may observed, my system of attachment is composed of screws or bolts fixed in the wood or in the iron forming a frame-work for the covering, and passing into a capsule or washer of nearly spherical form, which must prevent the water from penetrating, and which communicates the pressure of the screw to the plates at the joint. Before putting the pieces in their places, I prepare each one of the metallic sheets of which the roofing is to be made, and at the point where they lap over each other by embossing or striking up the plates around where the bolt or screw goes through them, in such a manner that they penetrate each other, and form a raised portion, convex on the upper side, and nearly in the same shape as the washer B, which I afterward place over it. After having put the washer in place, I pass the screw or bolt C through the hole made for this purpose in the washer and in the raised portions of the plates. A conical form may be given to the head of the screw or bolt C, (Represented in Fig. 5.) The washer is then threaded at the top, and receives a cap, D, which screws over and hermetically closes the opening for the screw. In temporary coverings I content myself with putting over the washer a very thin sheet of metal, which I fasten with an iron or brass wire, as shown in Fig. 6. The head of the screw or bolt may also be made in a square form, C, Fig. 5, with a groove in the under side, into which the top of the washer closely fits. This head then replaces the cap D, and closes itself the opening in the washer. Instead of embossing up both the sheets of metal where the bolts or screws pass through, the lower sheet may be left flat, and the upper one only embossed, Fig. 6, in which case I solder a small metallic plate, a little larger than the base of the washer around the passage for the screw, in such a manner that the washer shall press equally upon its whole surface. We see in all these arrangements that the water cannot penetrate through the joints of the screws or of the washers, and consequently the roofing is found to remain in good condition, as the result of the solidity of this system of putting the parts together.

I can omit the practice which involves a good deal of labor to put them in place. For this purpose I divide the sheets of zinc into pieces of equal size. This division made, I put them together vertically, as shown in Fig. 7, and horizontally, as shown in Fig. 1.

I can also make coverings in plates of cast-iron and other metals running to least possible thickness. These plates may be of all dimensions. I suggest that they may properly be about twenty inches square, and cast with a flange at right angles to it of five-tenths of an inch (more or less) on two parallel sides. They will be fastened with two washers with screws. It is necessary, at the time they are cast, to provide two bosses or enlargments, which are located at equal distance from the border, and at an inch and a half from the edge of the upper plate. To diminish the expense, the washers may be cast with the plates. The plates may be run in glass, manufactured of porcelain, of earthenware, or of terra-cotta. Marble and stone may be usefully employed in the manufacture of these plates; but it is necessary that their quality should permit them to be worked in a manner to reduce them to such a thickness that they shall not load the frame which supports them too heavily, and that the water shall not pass through them. In cutting them it is necessary to preserve the enlargements or washers. The coverings made with these materials present, in their employment, a great inconvenience in case of repair, to prevent which I proceed as follows: I place at first on one of the edges of the building a row of glass or other plates. The second range is formed of plates of cast-iron, zinc, copper, or other materials; the third and fourth ranges of plates of glass or other material; the fifth range as the second, and so on in such a manner that by passing on the portion of the roofing which shall have been covered with zinc, copper, or other metals the workman may proceed to the work of repairing. The rows of plates will be supported by brackets, nailed or screwed to the carpentry or frame-work, and covered as at present. In the coverings of steeples, domes, and other constructions with rapid descent I subject the raised portion or bosses to a modification, which consists in giving to them the enlarged or bell-mouthed form of the washer at the top, for it is probable that the water of the rain will pass between the metal covering and the washers. Then this enlargement will prevent the water from introducing itself through the bosses or raised portions. It may escape by the small opening made at the lower part of the washer, which involves no inconvenience.

My invention may also be applied to coverings of corrugated sheet-iron without changing the general construction and arrangement.

Having thus described the nature of my invention and the manner of putting it into practice, I desire that it be well understood that I do not limit myself to the forms, dimensions, and arrangements that I have represented and described, but reserve the right to modify the same as shall be found useful in practice.

I claim—

The combination of the raised portion or boss made upon the upper or both plates, the screw or bolt C, and the washer B, the opening in the side washer being closed at the top by a cap, D, or by other means which shall answer the purpose.

In testimony whereof I have signed my name to this specification before two subscribing witnesses.

VTIN. LASSERRE.

Witnesses:
E. MICHAUD.
JAMES W. BROOKS.